(12) United States Patent
Kray et al.

(10) Patent No.: US 10,422,340 B2
(45) Date of Patent: Sep. 24, 2019

(54) COMPOSITE BOOSTER SPOOL WITH SEPARABLE COMPOSITE BLADES

(71) Applicant: General Electric Company, Schenectady, NY (US)

(72) Inventors: Nicholas Joseph Kray, West Chester, OH (US); Suresh Subramanian, Karnataka (IN); Phani Nandula, Karnataka (IN); Dong-Jin Shim, Niskayuna, NY (US); Todd Alan Anderson, Niskayuna, NY (US); Mark Ernest Vermilyea, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 15/308,968

(22) PCT Filed: May 6, 2015

(86) PCT No.: PCT/US2015/029333
§ 371 (c)(1),
(2) Date: Nov. 4, 2016

(87) PCT Pub. No.: WO2015/171670
PCT Pub. Date: Nov. 12, 2015

(65) Prior Publication Data
US 2017/0074277 A1   Mar. 16, 2017

Related U.S. Application Data

(60) Provisional application No. 61/990,369, filed on May 8, 2014.

(51) Int. Cl.
*F04D 29/02* (2006.01)
*F01D 5/06* (2006.01)
(Continued)

(52) U.S. Cl.
CPC .............. *F04D 29/023* (2013.01); *F01D 5/06* (2013.01); *F01D 5/282* (2013.01); *F01D 5/284* (2013.01);
(Continued)

(58) Field of Classification Search
CPC .... F04D 29/023; F04D 29/321; F04D 29/324; F04D 29/322; F01D 5/06; F01D 5/282;
(Continued)

(56) References Cited

U.S. PATENT DOCUMENTS 3,501,090 A * 3/1970 Losee .................... F01D 5/282
416/189
4,334,827 A * 6/1982 Bouiller .................. F01D 5/282
416/193 A
(Continued)

FOREIGN PATENT DOCUMENTS

CN      102297158 A    12/2011
EP      1 076 159 A2    2/2001
(Continued)

OTHER PUBLICATIONS

Ceramic matrix composite—Wikipedia, the free encyclopedia (Year: 2011).*
(Continued)

*Primary Examiner* — David E Sosnowski
*Assistant Examiner* — Maranatha Boardman
(74) *Attorney, Agent, or Firm* — Dority & Manning, P.A.

(57) ABSTRACT

According to present embodiments or aspects thereof, a composite booster spool with separable composite blades is provided. The blades are inserted radially from within the inner circumference of the spool and extend outwardly through the spool. The system provides a reduced weight assembly as compared to prior art metallic or composite/metallic combination systems. Additionally, the blades are
(Continued)

separable which results in a more field-serviceable assembly over a fully integral system wherein the blades and spool are integrally formed from composites or combination of metal and composites.

12 Claims, 5 Drawing Sheets

(51) Int. Cl.
*F01D 5/30* (2006.01)
*F04D 29/32* (2006.01)
*F01D 5/28* (2006.01)
*F04D 29/64* (2006.01)

(52) U.S. Cl.
CPC ......... *F01D 5/3023* (2013.01); *F04D 29/321* (2013.01); *F04D 29/322* (2013.01); *F04D 29/644* (2013.01); *F05D 2240/30* (2013.01); *F05D 2300/20* (2013.01); *F05D 2300/224* (2013.01); *F05D 2300/43* (2013.01); *F05D 2300/603* (2013.01); *F05D 2300/6033* (2013.01); *Y02T 50/672* (2013.01)

(58) Field of Classification Search
CPC .. F01D 5/284; F01D 5/3023; F01D 2300/603; F01D 2300/6033; Y02T 50/672; F05B 2300/6003; F05B 2300/6013
See application file for complete search history.

(56) References Cited

U.S. PATENT DOCUMENTS

| 4,852,347 | A | * | 8/1989 | Reynolds | C04B 35/83 60/253 |
| 5,378,110 | A | * | 1/1995 | Ress, Jr. | F01D 5/02 416/229 R |
| 8,282,355 | B2 | * | 10/2012 | Blanchard | F01D 5/282 416/214 A |
| 9,976,429 | B2 | * | 5/2018 | Kray | B29C 70/345 |
| 2014/0079552 | A1 | | 3/2014 | Englebert | |

FOREIGN PATENT DOCUMENTS

| EP | 2400160 | A1 | | 12/2011 | |
| FR | 2347858 | A5 | * | 11/1977 | ............... F01D 5/06 |
| GB | 572859 | A | * | 10/1945 | ............... F01D 5/03 |

OTHER PUBLICATIONS

First Office Action and Search issued in connection with corresponding CN Application No. 201580024151.3 dated May 26, 2017.

International Search Report and Written Opinion issued in connection with corresponding PCT application PCT/US2015/029333 dated Jul. 14, 2015.

* cited by examiner

COMPOSITE BOOSTER SPOOL WITH SEPARABLE COMPOSITE BLADES

BACKGROUND

The disclosed embodiments generally pertain to a non-metallic booster spool for use in a gas turbine engine. More particularly, but not by way of limitation, present embodiments relate to a non-metallic, for example composite, booster spool with separable non-metallic, for example composite, blades extending through the booster spool.

A typical gas turbine engine generally possesses a forward end and an aft end with its several core or propulsion components positioned axially therebetween. An air inlet or intake is at a forward end of the engine. Moving toward the aft end, in order, the intake is followed by an engine core including a high pressure compressor, a combustion chamber, and a high pressure turbine. It will be readily apparent from those skilled in the art that additional components may also be included in the engine, such as, for example, low-pressure compressors and low-pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy wherein each set of stator vanes turns and accelerates the combustion gases to engage an adjacent row of rotating turbine blades.

Located aft of the fan is a low pressure compressor, also referred to as a booster. The booster comprises a spool which rotates with a plurality of blades to increase air pressure. Current spool structures are formed of metal or composite/metallic systems. These systems also include blades which are integrally formed with the spool. Such integral formation results in more difficult maintenance for the engine. For example, if one integral blade breaks, the entire spool or large sections thereof must be replaced in order to replace the blade and this results in maintenance which is more difficult and more complex to perform.

As may be seen by the foregoing, it would be desirable to overcome these and other deficiencies within a gas turbine engine. One of the continuous improvement goals in gas turbine engines, especially those used in the aviation industry, is to improve performance through weight reduction of engine components. Accordingly, it would be desirable to provide a more lightweight assembly in the low pressure compressor, or booster, to decrease weight of the assembly and improve performance. It would also be desirable to provide such lightweight configuration in a manner that need not require replacement of entire assemblies or large portions thereof for a single structure breakage or replacement.

The information included in this Background section of the specification, including any references cited herein and any description or discussion thereof, is included for technical reference purposes only and is not to be regarded subject matter by which the scope of the invention is to be bound.

SUMMARY

According to present embodiments or aspects thereof, a composite booster spool with separable composite blades is provided. The blades are inserted radially from within the inner circumference of the spool and extend outwardly through the spool. The system provides a reduced weight assembly as compared to prior art metallic or composite/metallic combination systems. Additionally, the blades are separable which results in a more field-serviceable assembly over a fully integral system wherein the blades and spool are integrally formed from composites or combination of metal and composites. Additionally, the blades may be formed without platforms which significantly reduce complexity of manufacturing.

According to some embodiments, a booster assembly comprises a non-metallic spool having a forward end and an aft end, a plurality of rows of holes, the holes extending circumferentially about the spool, a plurality of radially removable non-metallic blades extending through the holes from an internal side of the spool to an external side, and, the plurality of removable non-metallic blades each having a retention feature retaining the non-metallic blades along an interior side of the spool, and the plurality of non-metallic blades being removable.

Optionally, the non-metallic blades and the non-metallic spool are formed of the same material. According to other embodiments, the non-metallic blades and the non-metallic spool are formed of different materials. The non-metallic spool and the non-metallic blades are formed of at least one of ceramic matrix composite, ceramic composite, carbon composite, polymeric composite. The holes may extend axially or may extend at an angle to an engine axis. The holes may constant thickness or varying thickness in a radial direction. The holes may be elongated slots, circular, or polygon shaped. The booster assembly may further comprise a split ring disposed within the spool and inhibiting the plurality of blades from falling radially inwardly when rotation stops. The slots may be tapered in a radial direction. The spool may have a first zone, a second zone and a third zone. The first zone may be a multi-directional layup. The second zone may be a circumferential layup. The third zone being an axial layup. The booster assembly may further comprise an RTV seal disposed between the spool and the blade.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages is provided in the following written description of various embodiments, illustrated in the accompanying drawings, and defined in the appended claims.

BRIEF DESCRIPTION OF THE DRAWINGS

The above-mentioned and other features and advantages of present embodiments, and the manner of attaining them, will become more apparent and the composite booster spool with separable composite blades, including methods thereof, will be better understood by reference to the following description of embodiments taken in conjunction with the accompanying drawings, wherein.

DETAILED DESCRIPTION

Figure 1:
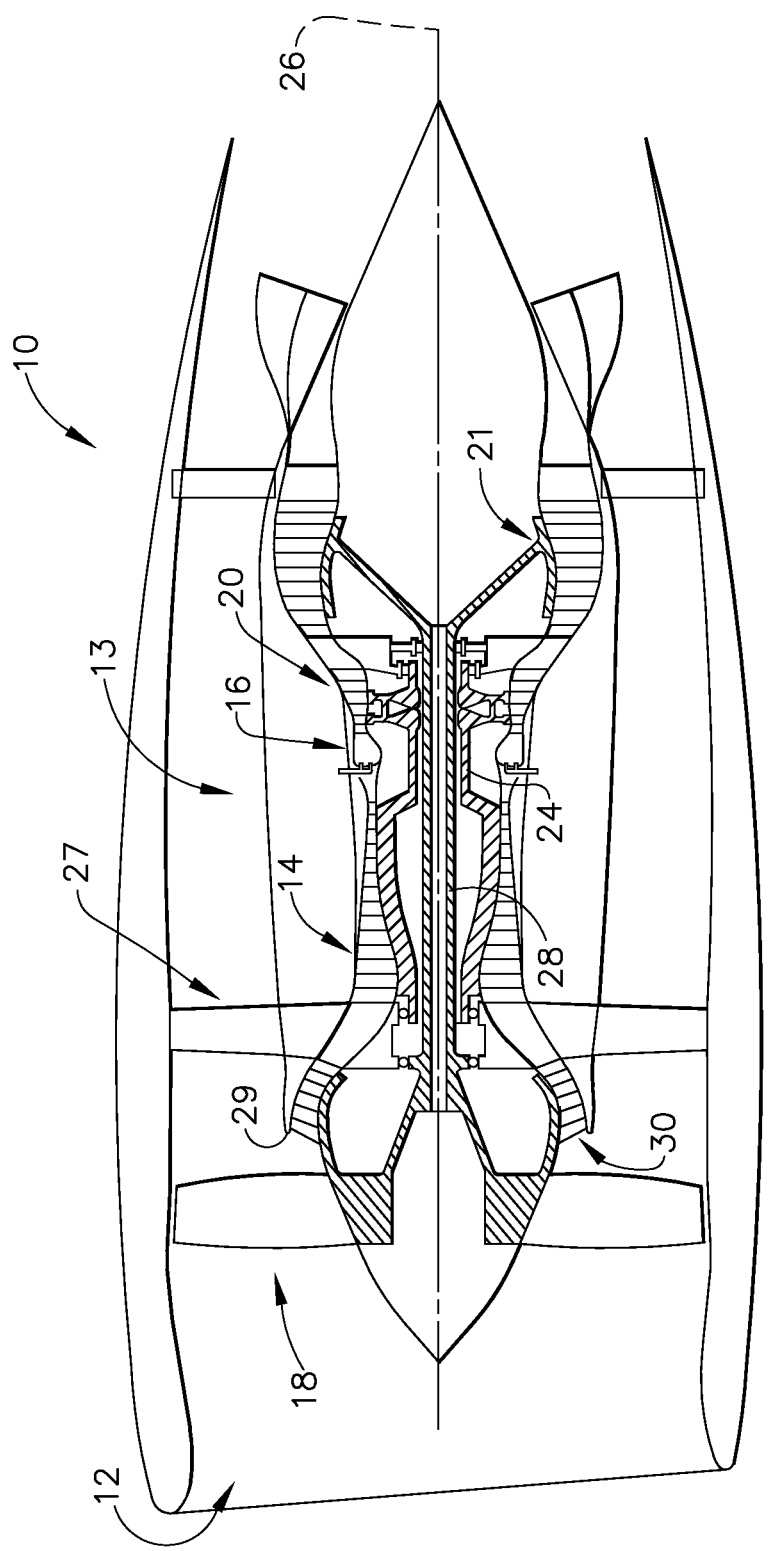
FIG. 1 is a side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-6, various embodiments of a non-metallic booster spool with separable non-metallic blades are depicted. The gas turbine engine booster, or low pressure compressor, is formed of an annular shaped non-metallic material, for example composite, having a plurality of holes therein. The holes receive non-metallic blades, for example composite, from the interior of the spool which extend radially outwardly. The spool may have a single stage or row of blades, or alternatively, may have a plurality of stages including a corresponding plurality of rows of blades.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown having an engine inlet end 12 wherein air enters the propulsor or core 13 which is defined generally by a compressor 14, a combustor 16 and a multi-stage high pressure turbine 20. Collectively, the propulsor 13 provides thrust or power during operation. The gas turbine 10 may be used for aviation, power generation, industrial, marine or the like.

In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. The turbine 20 is axis-symmetrical about the centerline 26 and includes a rotor disk and a plurality of circumferentially spaced apart blades. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. A low pressure turbine 21 may also be utilized to extract further energy and power additional compressor stages. The high pressure air may be used to aid in cooling components of the engine as well.

The gas turbine 10 is axis-symmetrical about engine axis 26 or shaft 24 so that various engine components rotate thereabout. The axis-symmetrical shaft 24 extends through the turbine engine forward end into an aft end and is journaled by bearings along the length of the shaft structure. The shaft rotates about a centerline 26 of the engine 10. The shaft 24 may be hollow to allow rotation of a low pressure turbine shaft 28 therein and independent of the shaft 24 rotation. Shaft 28 also may rotate about the centerline axis 26 of the engine. During operation the shaft 28 rotates along with other structures connected to the shaft such as the rotor assemblies of the turbine in order to create power or thrust for various types of turbines used in power and industrial or aviation areas of use.

Aft of the fan 18 and forward of the high pressure compressor 14 is a low pressure compressor, also known as the booster 30. The booster 30 receives air from the engine intake and fan 18. The air from the fan 18 moves to a splitter 29 and either moves through a by-pass duct 27 or into the booster 30. The booster 30 provides initial compression of air prior to that air moving into the engine core 13.

Figure 2:
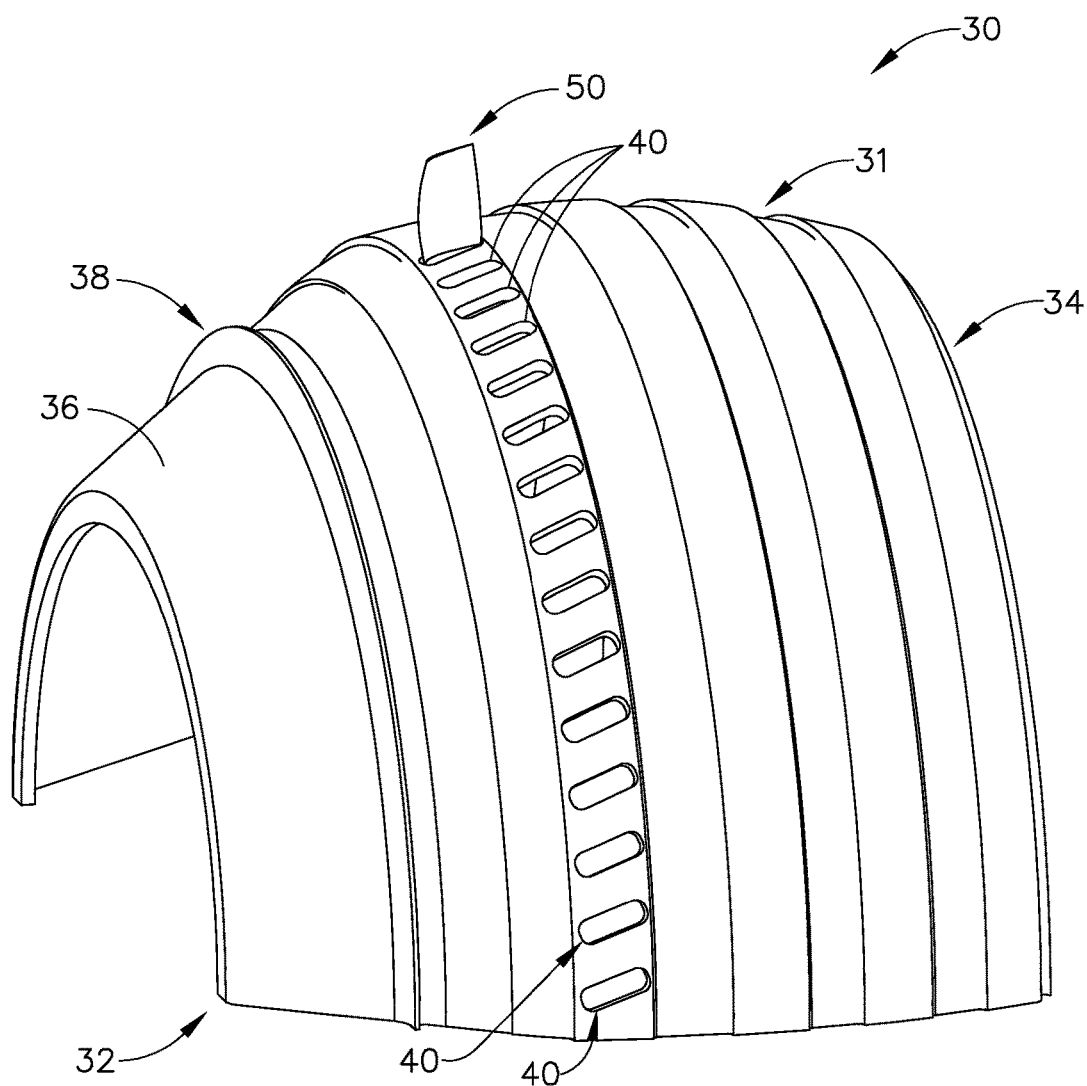
FIG. 2 is a perspective view of a partial booster spool including a single blade.

Referring now to FIG. 2, a perspective view of a portion of a gas turbine engine booster 30 is depicted. The booster 30 includes a circumferentially extending spool 31. The spool 31 is shown in a semi-circular form but may be a single structure defining the full circumferential form, or may be formed of two or more sections to define the circumferential form. The booster 30 is depicted in a semi-circular shape and may be formed of two sections which form the circular structure or may be formed of a single piece or in further alternatives, may be formed of multiple sections. The booster 30 includes a first axial end 32 which is a forward end directed closer to the fan 18 (FIG. 1). The booster 30 further extends axially towards a second aft end 34. The booster 30 is shown with a booster blade assembly 50 extending radially outwardly from the booster 30 and the blades are interdigitated with vane rows (not shown) which are adjacent to the booster blade assemblies 50. These booster vanes may extend radially inwardly from a non-rotatable annular structure and may be positioned forward or aft of each booster blade assembly 50.

At a forward end 32 of the booster 30, the diameter is smaller and tapers to a larger diameter moving in the aft direction. A conic section 36 extends from the first end 32 and tapers toward the first stage of booster blade assembly 50. A flange 38 extends radially along this conic section 36 in order to support structures that direct the airflow or inhibit leakage of air in the forward direction from the booster blade assembly 50.

The booster spool 31 rotates along with the booster blade assembly 50 to receive air from the fan 18 and begins compressing the air in the booster before the low pressure compressed air reaches the core 13 at the high pressure compressor 14. Thus, the booster provides initial compression of air received for the core 13.

Figure 4:
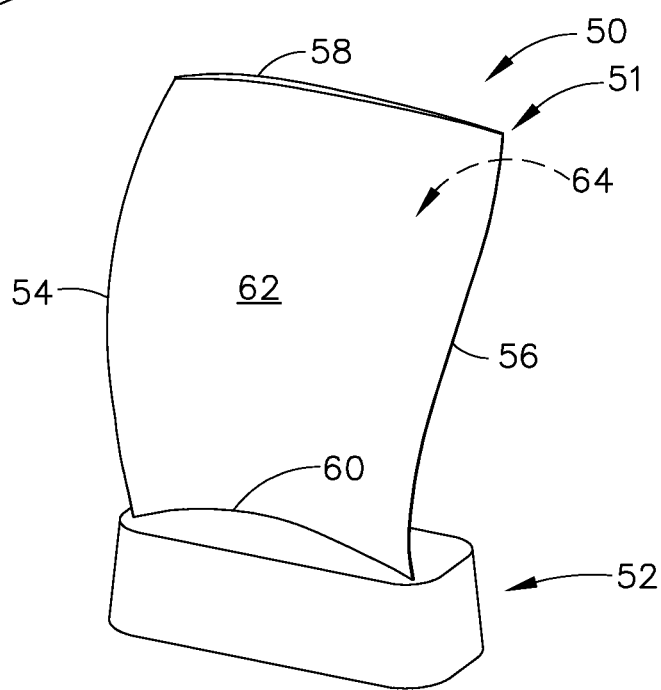
FIG. 4 is a perspective view of an exemplary composite blade.

The spool 31 includes a plurality of holes 40 which extend in one or more circumferential rows about the spool 31. A single row is shown but the spool 30 may include additional rows spaced apart in the axial direction. The holes 40 may comprise different shapes and according to one embodiment, are elongated slots which allow passage of the booster blade assembly 50. However, various hole sizes may be utilized such that the booster blade assembly 50 may pass therethrough and may be sealed from below by a retention structure 52 or shoulder (FIG. 4).

The booster spool 31 may be formed of a non-metallic material. The non-metallic may be, for non-limiting example, a composite material. Similarly, the blade assemblies 50 may be formed of non-metallics such as composites. The composites must take into account preservation of integrity of the booster spool 31. The predominant forces exerted in the spool 31 are in the circumferential direction and accordingly, an ability to withstand hoop stress is important. Alternatively, with respect to the booster blade assemblies 50, the radially exerted force is predominant. Composite materials typically include resin, such as an epoxy which has low inherent strength. The composite material may have a specific higher strength than the metal due the inclusion of a plurality of fibers which may be embedded in the same direction within the matrix of the composite material. The fibers are generally strongest in tension and accordingly, the fibers are laid out to arrange fibers in such orientation. The composite material may include carbon composites, ceramic matrix composites, polymeric composites and various other composite materials which may be strengthened with or without the use of fibers within the matrix. The composite may include segments or continuous plies or tapes and may be, with regard to the spool 31, wrapped in spiral or purely circumferential arrangements. Additionally, the layup may be formed in a single orientation or multi-directional orientation.

Additionally, in building up the layers of composite material, the composite tapes may be wound in one direction or may be in multiple directions. For example, one layer may be laid in a clockwise direction while an adjacent section may be laid in a counter-clockwise direction.

Even further, one or more layers may extend axially or at an angle to the axial direction. The holes 40 are shown as elongated slots. These slots may be arranged in a purely axial direction or may be angled relative to the axial direction. In the exemplary embodiment, the holes 40 are angled from the purely axial orientation. The booster 30 receives the composite blade assemblies 50 from an interior side of the booster device. Holes 40 may be formed during layup of the composite spool material or afterward via any suitable machining or manufacturing method.

Figure 3:
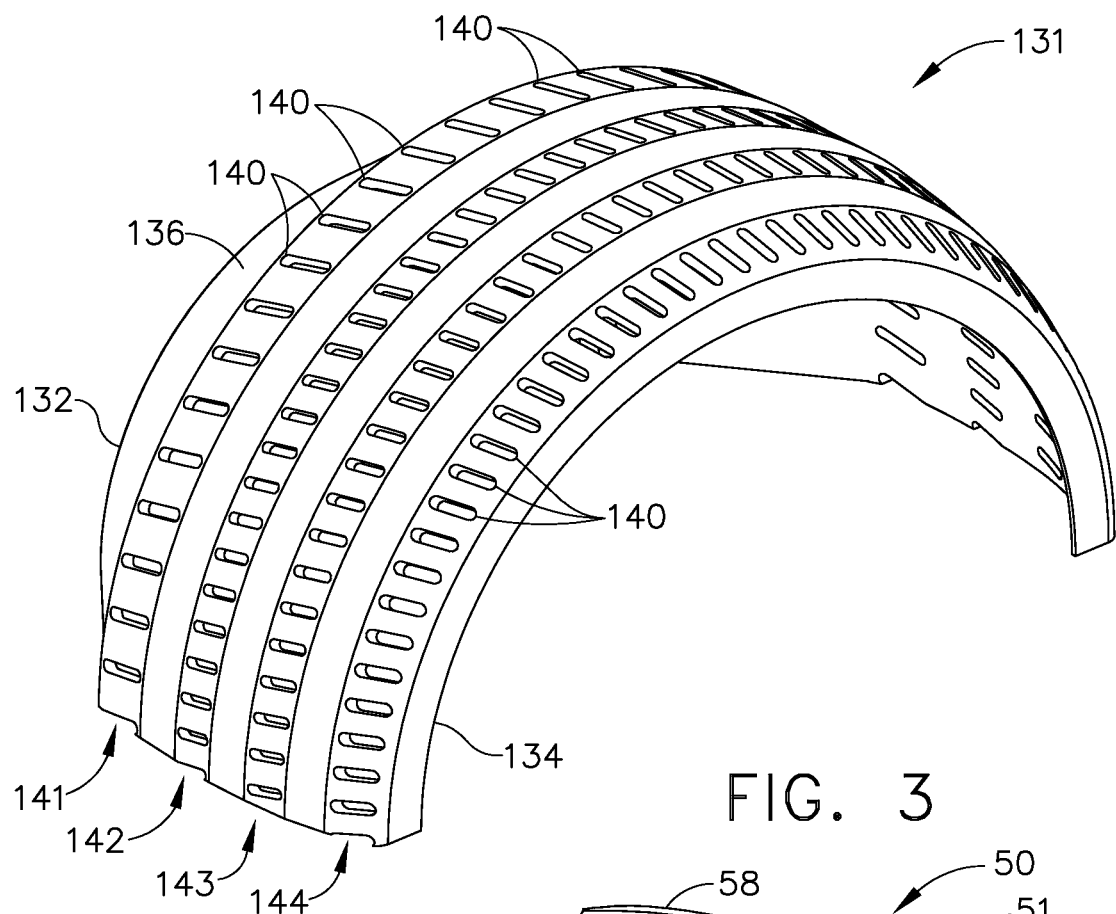
FIG. 3 is a perspective view of a partial composite spool including multiple stages of blade slots.

Referring now to FIG. 3, an alternate embodiment of the booster spool 131 is depicted. The spool 131 differs from the first embodiment in that it comprises a plurality of stages along its axial direction between the forward end 132 and the aft end 134, rather than a single stage. The stages are defined by rows of holes 140 which are arranged circumferentially. The first stage includes a plurality of holes 140 which may be of various shapes. In the instant embodiment, the holes are elongated to define slots which extend in the axial direction or alternatively, may be at an angle to the axial direction. A second stage 142 is shown aft of the first stage 141. Third and fourth stages 143, 144 follow the first and second stages as depicted. The holes 140 of the stages may all be aligned in the axial direction or may be angled relative to the axial direction. Further, the stages may be disposed at the same angle or each having differing angles. Additionally, the holes 140 may be aligned in the axial direction with forward and aft holes 140 or alternatively, may be offset circumferentially when moving in the axial direction from first stage 141 to the fourth stage 144. Additionally, various hole shapes may be utilized and the hole shapes amongst the stages may be the same shape or may vary in shape and/or size. Still further, the holes 40, 140 may be tapered from a radially inward opening size to a radially outward opening size.

Referring now to FIG. 4, a perspective view of an exemplary non-metallic blade assembly 50 is depicted. The assembly 50 includes a blade 51 and a retention feature 52. At a lower end of the blade 51 is a retention feature 52 which may be defined by a shoulder, dovetail, flange or other shaped structure inhibiting the blade assembly 50 from completely passing radially outwardly through the holes 40, 140. The blade 51 includes a leading edge 54 and a trailing edge 56 which extend between a tip end 58 of the blade and a base 60. The blade 51 includes a pressure side 62 which is depicted and an opposite suction side 64 depicted with broken lead line. The blade 51 defines an airfoil shape which is also formed of a composite material as previously described. These composites may be ceramic matrix composite, carbon composite, polymeric material or other composites defined by a plurality of layers of tapes or coupons formed of continuous lengths or short segments and which may be stitched together, solely molded or some combination in position to define the blade. The tapes or segments may be laid in a single direction or may be turned in multi-dimensional directions in order to improve strength. Alternatively, the composites may be comprised of multi-dimensional woven preformed structures. Composite blade construction allows tailoring of the bending and radial stiffness and strength in the blades to best match the needs in both directions.

At the lower end of the airfoil is the retention feature 52 which may be a shoulder or block as shown or alternatively, may be a dovetail or any other shape. The retention feature 52 is of a size which is greater than the hole size 40, 140 so that the blade 50 is positioned from the radially inward side of the spool 31, 131 and extends outwardly until the retention feature 52 engages the inner surface of the spool 31, 131.

The system provides a reduced weight assembly as compared to prior art metallic or composite/metallic combination systems. Additionally, the blades are separable and individually replaceable which results in a more field-serviceable assembly over a fully integral system wherein the blades and spool are integrally formed from composites or combination of metal and composites. Further, since the flowpath surfaces between adjacent blades are formed by the spool itself rather than specifically contoured platforms associated with the blades, the blades may be formed without platforms which significantly reduce complexity of manufacturing.

Figure 5:
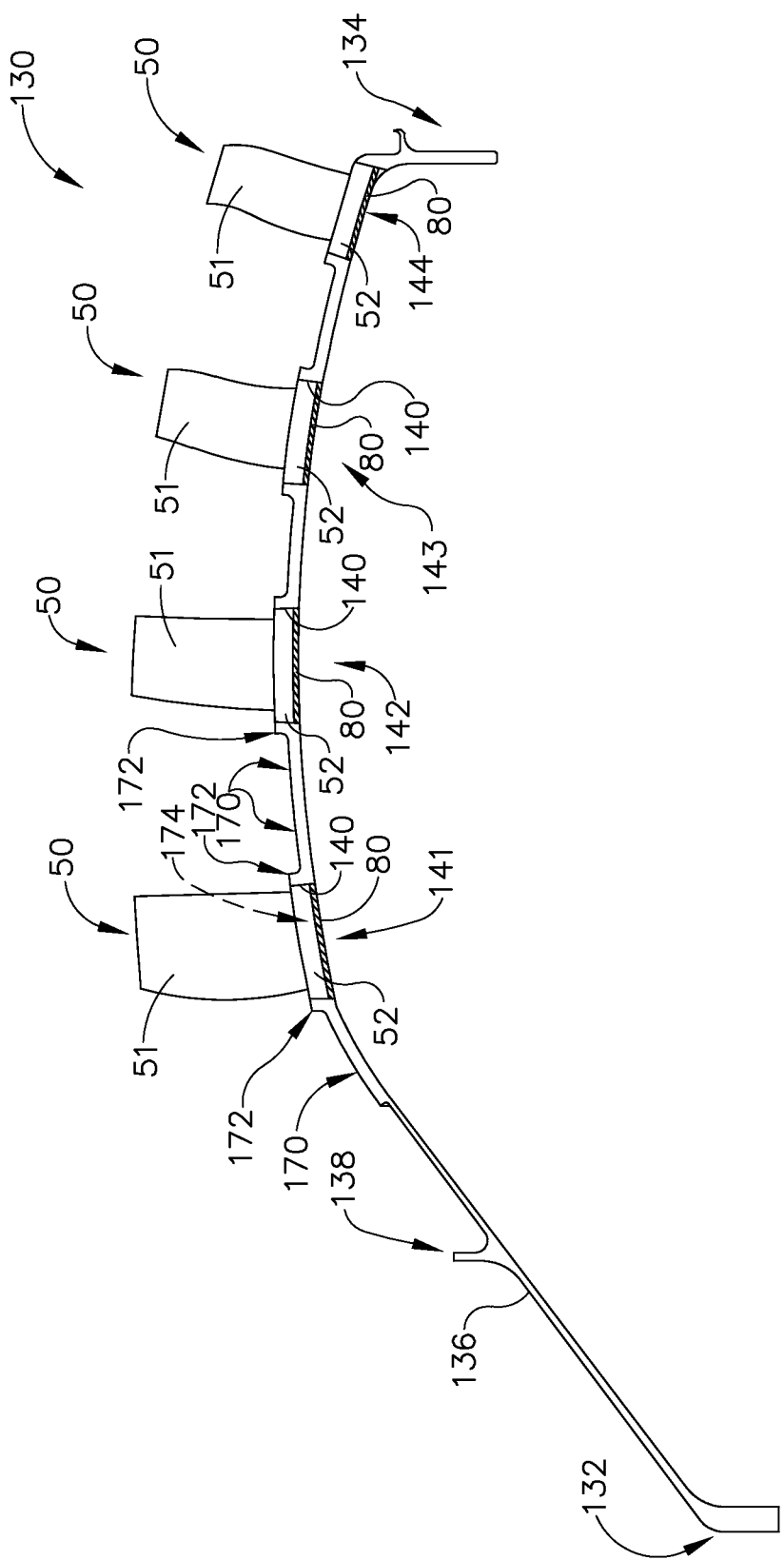
FIG. 5 is a side section of an exemplary spool including multiple composite blades; and, FIG. 6 is a section view of a single composite blade extending through the composite spool of the exemplary embodiments.

Referring now to FIG. 5, a side section view of the booster assembly 130 is depicted. The spool 131 is shown with the forward end 132 and conical section 136 extending upwardly toward the blade region of the spool 131 and on toward the aft end 134. The blade assemblies 50 are arranged in the four rows defining stages 141, 142, 143, 144. The blades 51 extend through the holes 140 and the retaining features 52 are captured by the holes, precluding the blades 51 from extending radially completely through the spool 131.

Also, depicted in the view are the various zones of layup for the spool 131. A first zone 170 is depicted between the blade assemblies 50 and forward of the first blade assembly 50. The first zone 170 may be a multi-directional layup wherein the various layers of composite material are laid up in multiple orientations in order to increase strength. A second zone 172 provides for increased thickness in the area defining the holes 40, 140 for positioning of the blade assemblies 50. The second zone 172 provides composite material laid up predominantly circumferentially to provide increased hoop strength in this region. The third zone 174, wherein the holes 40, 140 are defined, may be laid up in predominantly axially directed plies in order to increase strength in the axial direction. Holes 140 may be formed during layup of the composite spool material or afterward via any suitable machining or manufacturing method.

Additionally, beneath each row of blades 51 and retention features 52 is a retention ring 80. The retention ring 80 is defined of a semi-circular shape which is greater in perimeter than the circumference defined along the rows of blades. The retention ring 80 provides a radially outward force on the blades 51 and retention features 52 so that when the engine is stopped or at low speed, the blade cannot fall radially inwardly through the spool 131. The retention ring 80 may be formed of metallic parts or may be formed of composite.

Figure 6:
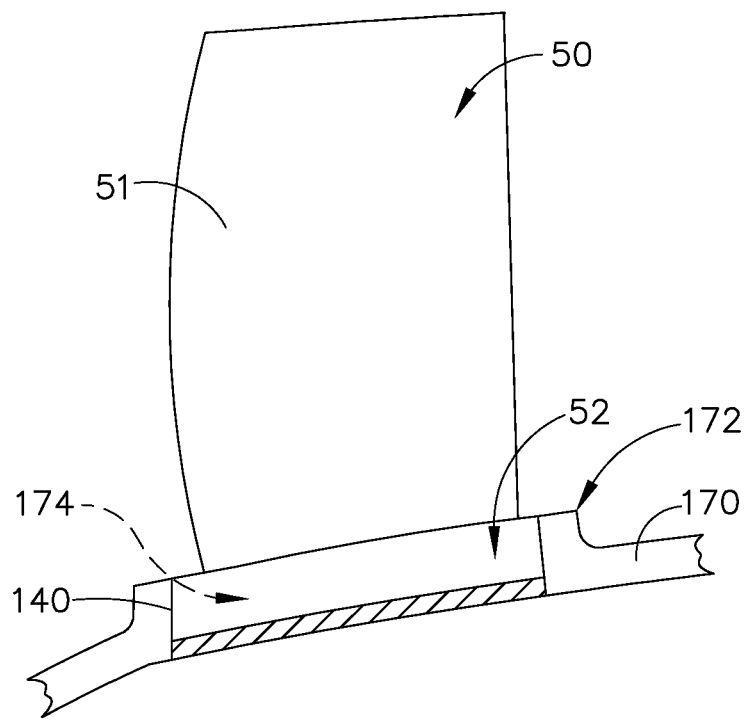

A close up view of a single blade 51, retention feature 52 and hole 140 is shown in FIG. 6. The first, second and third zones of composite material 170, 172, 174 are shown. The third zone 174 may be a constant radial thickness or may be formed of varying thickness.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A booster assembly, comprising:
   a non-metallic spool having a forward end and an aft end;
   a plurality of rows of holes, wherein each row of holes includes a plurality of holes arranged circumferentially about said spool, wherein each hole of the plurality of rows of holes are elongated slots; and
   a plurality of radially removable non-metallic blades extending through said plurality of rows of holes from an internal side of said non-metallic spool to an external side;
   wherein said plurality of radially removable non-metallic blades each have a retention feature retaining said non-metallic blades along an interior side of said spool,
   wherein said non-metallic spool has a first zone forward of the plurality of rows of holes and a second zone having an increased thickness compared to the first zone in the area defining a forward row of holes of the plurality of holes, and wherein the first zone is formed from a multi-directional layup of various layers of composite materials laid up in multiple orientations, and further wherein the second zone is formed of composite material laid up predominantly circumferentially to increase hoop strength in the second zone compared to the first zone.

2. The booster assembly of claim 1, wherein said non-metallic blades and said non-metallic spool are formed of the same material.

3. The booster assembly of claim 1, wherein said non-metallic blades and said non-metallic spool are formed of different materials.

4. The booster assembly of claim 1, wherein said non-metallic spool and said non-metallic blades are formed of at least one of ceramic matrix composite, ceramic composite, carbon composite, polymeric composite.

5. The booster assembly of claim 1, wherein said elongated slots extend axially.

6. The booster assembly of claim 1, wherein said elongated slots extend at an angle to an engine axis.

7. The booster assembly of claim 1, said elongated slots having walls of one of constant or varying thickness in a radial direction.

8. The booster assembly of claim 1, further comprising a retention ring disposed within said spool and inhibiting said plurality of blades from falling radially inwardly when rotation stops.

9. The booster assembly of claim 1, wherein said elongated slots are being tapered in a radial direction.

10. The booster assembly of claim 1, said spool having a third zone of increased strength in the axial direction compared to the second zone.

11. The booster assembly of claim 10, said third zone being a predominantly axial layup.

12. The booster assembly of claim 1, wherein said retention features are comprised of a flange geometry.

* * * * *